(No Model.)
J. B. WEST.
GRATING.
No. 424,525. Patented Apr. 1, 1890.
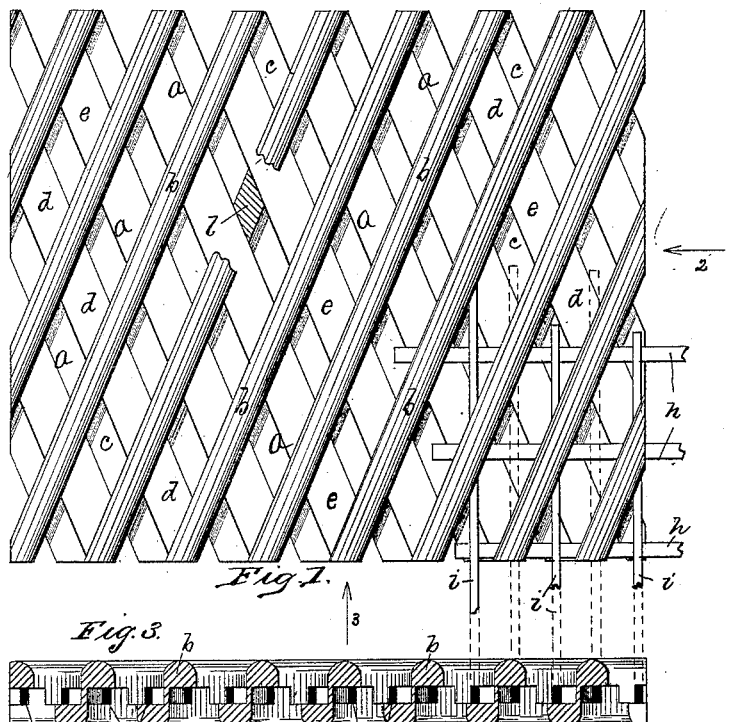
Fig. 1.
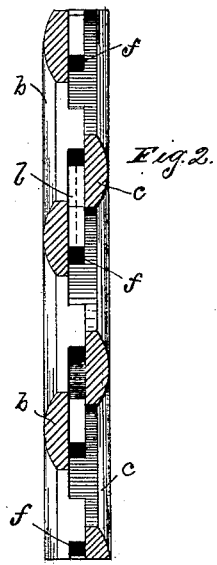
Fig. 2.
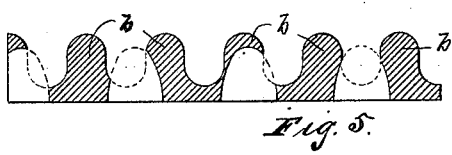
Fig. 3.
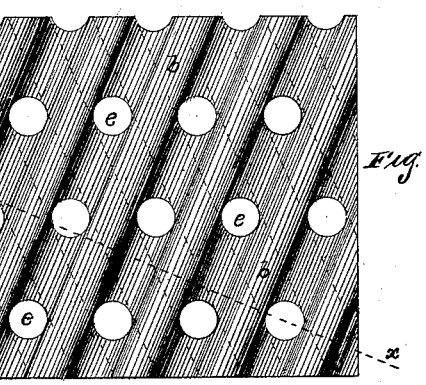
Fig. 4.
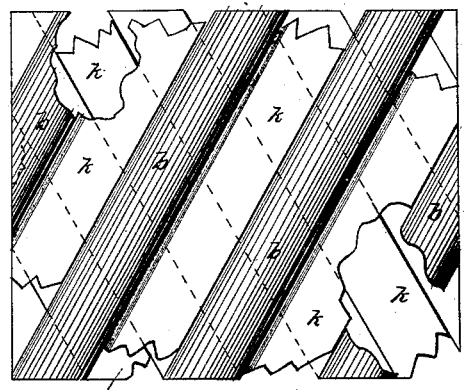
Fig. 6.
Fig. 5.
Attest:
M. McDermott.
W. H. Whitmore.
Inventor:
Jonathan B. West
By E. B. Whitmore, Atty.

United States Patent Office.

JONATHAN B. WEST, OF ROCHESTER, NEW YORK.

GRATING.

SPECIFICATION forming part of Letters Patent No. 424,525, dated April 1, 1890.

Application filed June 24, 1889. Serial No. 315,390. (No model.)

*To all whom it may concern:*

Be it known that I, JONATHAN B. WEST, of Rochester, in the county of Monroe and State of New York, have invented a new and useful Improvement in Gratings, which improvement is fully set forth in the following specification and shown in the accompanying drawings.

This invention is a new form or kind of open-work or grating for various uses, as in manufacturing furniture, doing inside finishing, and for panel-work, window-sash, and ornamental work generally in carpentery and building. This open-work or grill is cut of a single prismatic piece of wood, for instance, as a board or plank, in various forms, some of which are herewith shown. The work is formed by cutting channels in the opposite faces of a board of any size, the channels in the two faces running in different directions and being cut sufficiently deep to meet at the middle plane of the board or to pass that plane, as may be wished. When the channels are thus formed, openings are formed through the board laterally where the channels intersect each other, these openings being diamond-shaped, square, circular, or of other form, according to the relative direction and depth of the opposing channels and the form of the tool with which the channels are formed. When the channels are cut to a depth exceeding one-half the thickness of the board beside the lateral openings through the board just mentioned, other openings or passages are also formed through the board parallel with and midway between the two faces of the board. These openings or passages have directions at right angles to each other and different from the directions of the primary channels. These passages may be used to receive strips of wood of different color than that of the board or strips of glass or other material of ornamental colors and kinds.

The invention is hereinafter fully described, and more particularly pointed out in the claims.

Referring to the drawings, Figure 1 shows a side of one form of grill. Fig. 2 is an edge view indicated by arrow 2 in Fig. 1, and Fig. 3 a view of the same indicated by arrow 3. Fig. 4 shows another form of the work, Fig. 5 being a section on the dotted line $x\,x$ in Fig. 4; and Fig. 6 shows a form in which strips of glass are placed in the channels.

As shown, a series of parallel channels $a$ are formed diagonally in one face of a board, leaving bars or ribs $b$ between them. The board is then turned and similarly grooved or channeled on the other face, leaving bars $c$, $d$ being the channels of that side. If the opposite channels meet at the middle plane of the board, or if the cutters forming the channels pass more deeply into the board than to the middle plane thereof, openings $e$ will be formed through the board laterally, as shown. Where the cutters cut more than half way through the board in forming the channels, right-line openings or passages $f$, Fig. 2, and $g$, Fig. 3, are formed at right angles with each other and parallel with the respective edges of the board and with the faces or flat sides of the board. Through the passages $f$ bars or strips $h$ may be passed, and through the passages $g$ similar strips or bars $i$ may be passed, as shown in Fig. 1. The bars $h$ and $i$ may be formed of wood of a contrasting color with the board, or they may be of colored glass or other material for the purpose of ornamentation.

In some work—as, for instance, the borders of the openings in sash-doors—I place strips $k$, Fig. 6, of colored glass at the bottoms of the channels on both sides of the door. The channels in this case are formed straight across at the bottom or flat, and the strips of glass have the same width as the channel, so as to fill them in a lateral direction. Thus constructed the appearance to an observer is that of diamond-shaped pieces of glass set into the wood.

When the cutters extend into the respective sides of the body to a distance exceeding one-half the thickness of the body, connecting pieces or blocks $l$, Figs. 1 and 2, are formed between the bases of the opposing bars. These pieces, as shown, are diamond-shaped, and they both separate and tie together the bars on the two faces of the board or body, all being in one piece with the bars.

If the channels in the two faces of the body are made at right angles with each other, the interstices $e$ will be square and diamond shape, as shown in Figs. 1 and 6, if the lines of the two sets of channels form an acute angle. If the nose of the tool used to form the channels is semicircular, the opening *e* will be circular, as shown in Fig. 4.

Other materials than wood may be employed for this work, as prepared india-rubber, celluloid, &c.

What I claim as my invention is—

1. A prismatic body formed with channels in two of its opposite faces, the channels in one face lying in different directions from those of the channels in the other face, and the planes of the bottom parts of the channels in both faces coinciding, the body being in a single piece.

2. A prismatic body formed with channels in its opposite faces, the channels of the two faces lying in different directions and each cut to a depth greater than half the thickness of the body, substantially as shown and described.

3. A prismatic body having channels formed in its opposite faces, the channels in one face crossing those in the other face and forming longitudinal openings through the body midway between said faces, substantially as shown.

4. A prismatic body having channels formed in its opposite faces, the channels in one face crossing those in the other face and forming openings through the body in a plane midway between said faces and parallel therewith, in combination with strips of wood or other material passed through said openings, substantially as shown.

5. A body, as a piece of board, having channels cut in its opposite broad faces, leaving bars between them, the channels in one face crossing those in the other face and each being cut to a depth greater than half the thickness of the board or body, and separating blocks or columns joining said opposing bars and being in one piece with said bars, substantially as shown and described.

In witness whereof I have hereunto set my hand, this 13th day of June, 1889, in the presence of two subscribing witnesses.

JONATHAN B. WEST.

Witnesses:
E. B. WHITMORE,
M. L. McDERMOTT.